United States Patent [19]

Miyazawa et al.

[11] Patent Number: 5,313,161
[45] Date of Patent: * May 17, 1994

[54] DISPLACEMENT SENSOR WITH A MOVABLE ELEMENT SHAPED TO PROVIDE A LINEAR RESPONSE CURVE

[75] Inventors: Shozo Miyazawa; Takanori Kobayashi, both of Suzaka, Japan

[73] Assignee: Techno Excel Kabushiki Kaisha, Suzaka, Japan

[*] Notice: The portion of the term of this patent subsequent to Sep. 10, 2008 has been disclaimed.

[21] Appl. No.: 661,171

[22] Filed: Apr. 2, 1991

Related U.S. Application Data

[62] Division of Ser. No. 415,333, Sep. 14, 1989, Pat. No. 5,046,702.

[30] Foreign Application Priority Data

Mar. 14, 1987 [JP] Japan .................................. 62-59898
Mar. 20, 1987 [JP] Japan .................................. 62-67605

[51] Int. Cl.$^5$ .................................................. G01B 7/14
[52] U.S. Cl. .............................. 324/207.16; 324/207.22; 324/207.24

[58] Field of Search .............. 324/207.11, 207.16, 324/207.24, 207.22; 340/870.31

[56] References Cited

U.S. PATENT DOCUMENTS 5,045,785  9/1991  Hansen ........................... 324/207.16
5,046,702  9/1991  Miyazawa et al. ............. 251/129.04

*Primary Examiner*—Walter E. Snow

[57] ABSTRACT

The present invention relates to a solenoid device such as a flow control valve and a displacement sensor. In a conventional solenoid device, it is not possible to get characteristic curve for easy control of the input voltage to an electromagnetic coil and the stroke of a plunger, or the stroke of a plunger and the frequency of a coil. Thus, it is difficult to control, land the stroke of the plunger is short. Therefore, in the present invention, the above stated disadvantages are solved by forming the end section of the plunger tapered, so that an electromagnetic valve having linear characteristic curve and longstroke plunger or a highly precise displacement sensor can be provided.

5 Claims, 6 Drawing Sheets

DISPLACEMENT SENSOR WITH A MOVABLE ELEMENT SHAPED TO PROVIDE A LINEAR RESPONSE CURVE

This application is a division of copending application Ser. No. 07/415,333, filed on Sep. 14, 1989, now U.S. Pat. No. 5,046,702. The entire contents of which are hereby incorporated by reference.

FIELD OF TECHNOLOGY

The present invention relates to a solenoid device, and more precisely relates to such solenoid devices as an electromagnetic valve which has a coil and a plunger, a displacement sensor, etc.

BACKGROUND TECHNOLOGY

Conventionally, an electromagnetic valve, which is one type of solenoid devices, has a plunger which is movably provided in a center hole of an electromagnetic coil in the axial direction thereof. A valve body is provided at the front end of the plunger. There is shown a proportional control valve for controlling the amount of flow in FIG. 15.

A proportional control valve 900 has an electromagnetic coil 904, which covers the outer face of a plunger 902. There are provided yokes 906 and 908 around the electromagnetic coil to enclose the magnetic circuit. The plunger 902 is biased to the electromagnetic coil 904 by leaf springs 910 and 912. The force working on the plunger 912 is transmitted to a valve body 916 by a slide pin 914.

Upon passing the electric current through the electromagnetic coil 904, the magnetic force corresponding to the intensity of electric current, voltage or number of pulse biases the plunger 902 downward to press the valve body 916 which is connected to a diaphragm. The amount of flow at an exit 920 can be controlled under the governor theory.

An example of displacement sensors is disclosed as Japanese Patent Provisional Publication (Kokai) No. 61-172011. This displacement sensor has a coil and a diaphragm. A magnetizable body, which can be slidable in the coil, is attached to the diaphragm. The end face of the magnetizable body is arranged outside of the coil. The change of the reactance (or the frequency) of the coil caused by displacement of the magnetizable body which is connected to the diaphragm is measured as the amount (or pressure) of displacement of the diaphragm.

DISCLOSURE OF THE INVENTION

However, the above stated solenoid devices have the following problems.

In the proportional control valve, the magnetic circuit closes via the yokes and the plunger. The magnetic force works to the lower end of the plunger because the cross sectional area of the plunger is the same at any position. But the magnetic force working to the yokes and the plunger changes due to the rule of Coulomb because of the gap therebetween. Therefore, the degree of the opening of the valve body curvilinearly changes when the degree of the opening of the valve body is changed by adjusting the intensity of the electric current (or the voltage), so that it is difficult to control or to adjust precisely. To adjust the change of the degree linearly, an additional mechanism (e.g. spring) should be required, so that manufacturing cost will be increased.

While, in the displacement sensor, when the end face of the magnetizable body comes up to the opposite end face of the coil, the reactance of the coil quickly changes becoming the gap zero, so that a large amount of change of the reactance cannot be gained once the end section of the magnetizable body has been inserted into the center hole of the coil. Therefore, the range in which the amount of displacement of such displacement body as a diaphragm can be gained as the change of the reactance of the coil is limited from the position at which the end face of the magnetizable body is close to the opposite end face of the coil to the position at which the end face of the magnetizable body begins insertion into the center hole of the coil. Namely, the stroke of the displacement is quite limited in narrow a range, so that a large amount of the displacement cannot be measured.

The characteristic curve of the stroke of the magnetizable body and the reactance of the coil is curvilinearly (i.e. the curve of secondary degree) changed, so that an expensive microprocessor having a large memory capacity is needed to convert the change of the reactance into the amount of the displacement.

Therefore, the object of the present invention is to provide a solenoid device such as an electromagnetic valve which can precisely control the amount of flow, a displacement sensor having the long stroke of a magnetizable body, long effective measuring range, and whose characteristic curve of the stroke of the magnetizable body and the reactance of a coil can be set at the user's option, etc.

To solve the above stated problems, the solenoid device of the present invention is characterized in that the plunger has a face which runs non-parallel to the axis in the one end section, and there is at least one part which corresponds to the periphery on the one end face of the plunger.

In the solenoid device of the present invention, the plunger can be stopped in movement midway of the stroke in the case of a proportional control valve, so that the amount of flow can be precisely and correctly controlled at the user's option by controlling input voltage or number of pulse to the electromagnetic coil. And the plunger can be moved smoothly, so noise and vibration can be prevented. Moreover, the control of the amount of flow can be controlled solely by a power source, so that conventional additional mechanism such as a spring can be omitted and manufacturing cost can be reduced.

In the case of the displacement sensor, the characteristic curve of the plunger stroke and the frequency will be almost linear, so precise measuring can be executed. If the tapered end section or the face, which is non-parallel to the axis, of the plunger is formed longer, the displacement sensor having a long stroke and wide effective measuring range can be realized. The characteristic curve is linear, so it will be easy to control by even an inexpensive microprocessor.

Moreover, if the angle and the shape of the tapered section on the face, which is non-parallel to the axis of the plunger is varied, the characteristic curve of the reactance (or the frequency) can be changed at the user's option. Unlike the conventional displacement sensor, the front end of the plunger conventional displacement sensor, the front end of the plunger can be predisposedly inserted into the center hole of the coil, so that the sensor can be compacted in size.

EMBODIMENTS

Figure 1:
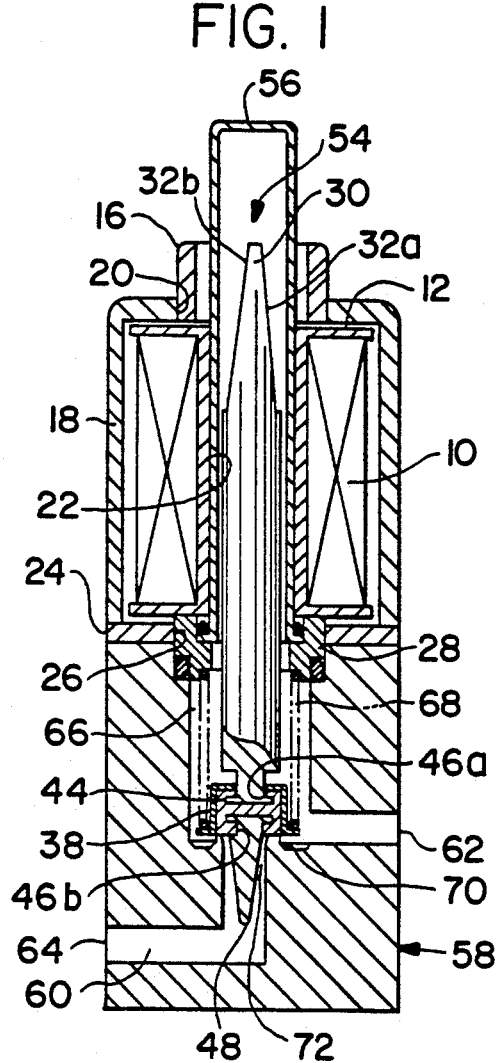
FIG. 1 shows a front sectional view of the proportional control valve as the first embodiment of the solenoid device of the present invention.
Figure 2:
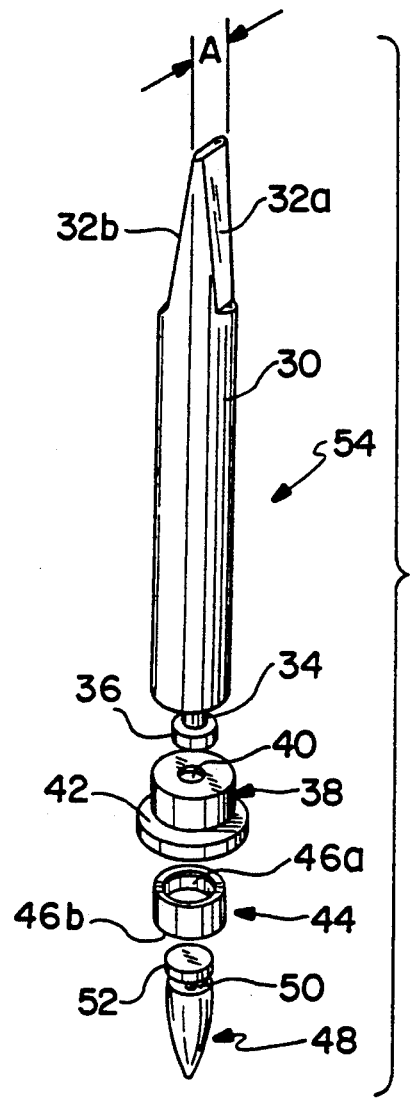
FIG. 2 shows an exploded perspective view of the plunger unit of FIG. 1.

Preferred embodiments of the present invention will now be described in detail with reference to the accompanying drawings.

First Embodiment

The first embodiment will be explained with reference to FIGS. 1-6. The solenoid device of this embodiment is a proportional control valve.

The structure will be explained first.

An electromagnetic coil 10 is formed by winding copper wire around a bobbin 12 which is made of non-magnetizable material.

An upper magnetic pole 16 is made of a ring-like magnetizable material, and it is press-fitted in a through-hole 20 which is bored in an upper yoke 18.

The upper yoke 18 is made of magnetizable material and covers the electromagnetic coil 10. There is bored the through-hole 20, which is coaxial to the center hole 22 of the electromagnetic coil 10, in the upper yoke, and the upper magnetic pole 16 is press-fitted therein.

A lower material 24 is made of magnetizable yoke, and it is fixed at the lower fringe section of the upper yoke 18 to close the opening section of the upper yoke 18.

There is also bored a through-hole 26, which is coaxial to the center hole 22 of the electromagnetic coil 10 in the lower yoke 24. There is press-fitted a lower magnetic pole 20 in the through-hole 26.

The lower magnetic pole 28 is made of a ring-like magnetizable material, and it is press-fitted in the through-hole 26 of the lower yoke 24. Therefore, there is spacing between the upper magnetic pole 16 and the lower magnetic pole 28 in the center hole 22 of the electromagnetic coil 10, so that the leakage magnetic field is generated therebetween.

A plunger 30 is made of a magnetizable round rod. Its upper end section is tapered and the both sides thereof are cut to form the tapered faces 32a and 32b which are non-parallel to the axis of the plunger 30. There is formed a part A having a width the same as the diameter of the plunger 30 on the upper end face of the plunger 30. The sectional area of the tapered section is gradually reduced as it approaches the upper end. Therefore, both end sections of the part A on the upper end face of the plunger 30 correspond to the periphery of the plunger 30. Note that, the tapered faces 32a and 32b are always in the leakage magnetic field even if the plunger 30 is moved in its axial direction.

Figure 3:
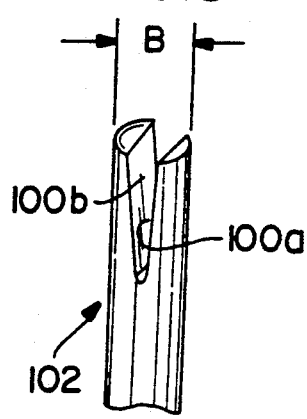
FIG. 3 shows a perspective view of another example of the plunger.
Figure 4:
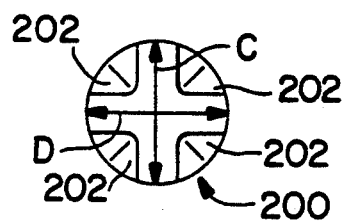
FIG. 4 shows a plan view of another example of the plunger.

The purpose of forming the part A having a width the same as the diameter of the plunger 30 in the tapered section thereof is to maintain balanced operation of the plunger 30. Note that, the shape of the front end of the plunger may be, as shown in FIG. 3, divided in its upper section into two divided pieces each of which respectively has tapered faces 100a and 100b. In this case, the part B has the same width of the plunger 102. The tapered section is not essentially required to be continued. If both ends of the part B are the same as the diameter of the plunger 102, it is allowed even the tapered section is divided. And as shown in FIG. 4, the parts O and D have the width which is the same as the diameter of the plunger 200. The sideway parts 202 of the plunger 200 are formed slopes or curved faces to be tapered. In the plunger in FIG. 1, too, there can be bored a hole in the center thereof.

In FIGS. 1 and 2 again, the lower section of the plunger 30 has the small-diameter section and the flange 36 at the lower end.

Numeral 38 is a valve cap. The small-diameter section 34 of the plunger 30 is fitted into the through-hole 40 which is bored in the upper face of the valve cap 38 and is prevented from coming off by the flange 36. There is also formed the flange 42 at the lower end of the cap 38.

A valve body 44, which is made of elastic material, is accommodated in the cap 38 and there are bored bottomed holes 46a and 46b in the upper face and bottom face thereof. Diameters of the innermost sections of the holes 46a and 46b are larger than the diameters of the entry section thereof, and the flange 36 of the plunger 30 is pressed into the hole 46a to engage therein.

A control member 48 is formed tapered shape like a needle and there are a small-diameter section 50 and a flange 52 provided in the upper section thereof. The small-diameter section 50 is pressed into the hole 46b of the valve body 44 and is prevented from coming off the valve body 44 by the flange 52. With this structure, the plunger 30, the cap 38, the valve body 44 and the control member 48 are assembled in one body to form the plunger unit 54 as a valve mechanism.

A pipe casing 56, which is a bottomed casing made of thin magnetizable material, is fitted in the center hole 22 of the bobbin 12 of the electromagnetic coil 10. The upper end is closed, the lower end is opened, and the fringe section of the opening is bent outward to prevent it from disengaging from the center hole 22.

The plunger unit 54 is slidably fitted in the pipe casing 56.

A valve proper 58 is fixed on the bottom face of the lower yoke 24, and there is formed a flow path 60 therein. Numeral 62 is the entrance of the flow path; numeral 64 is the exit thereof. There is formed a space 66 in which the lower part of the plunger unit 54 is inserted in the upper part of the valve proper 58, and there is fitted the lower part of the lower magnet pole 28 in the upper end of the valve proper.

A coil spring 68 covers the lower part of the plunger unit 54 and is elastically provided between the bottom face of the lower magnetic pole 28 and the flange 42 of the cap 38 to bias the plunger unit 54 downward.

A valve seat 70 is provided in the flow path 60, and the flow path 60 can be closed when the valve body 44 contacts the valve seat 70.

Next, the action of the proportional control valve will now be explained.

In the state shown in FIG. 1, the plunger 30 is biased by the coil spring 68 to press the valve body 44 on the valve seat 70 for closing the flow path 60, when no electric current passes through the electromagnetic coil 10.

To pass fluid through the flow path 60, the electromagnetic coil 10 is inputted voltage. Upon passing the electric current through the electromagnetic coil 10, the electromagnetic coil 10 generates the magnetic field. Then the magnetic circuit closes via the upper magnetic pole 16, the upper yoke 18, the lower yoke 24, the lower magnetic pole 28, and the plunger 30. The plunger 30 is always biased downward by its own weight and elasticity of the coil spring 68 but the plunger 30 is gradually attracted upward by the magnetic force of the electromagnetic coil 10 against the elasticity of the coil spring 68 until the magnetic force and the elasticity mutually balanced, then the plunger stops. The valve body 44 and the control member 48, which are assembled with the plunger as the plunger unit 54, also gradually travel upward with the plunger 30.

When the valve body 44 travels upward, the valve body separates away from the valve seat 70, and the valve clearance 72 between the needle-like control member 48 and the flow path in which the control member 48 is inserted opens, so that the fluid, which has been stopped flowing by the valve body 44 and the valve seat 70 is able to flow via the entrance 62 through the valve clearance 72 to the exit 64.

Figure 5:
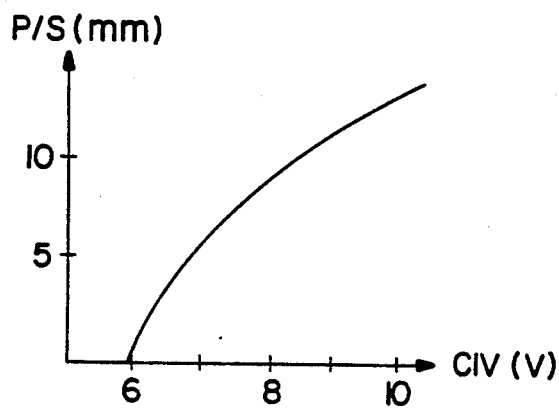
FIG. 5 shows a graph of the characteristic curve of the plunger stroke and the input voltage of the electromagnetic coil of the first embodiment.

The upper end section of the plunger 30 is formed like a wedge with the tapered faces 32a and 32b. The upper end section is always within the leakage magnetic field, so that the magnetic force working changes with the change of the surface area of the plunger 30 when the input voltage to the electromagnetic coil 10 is changed. The plunger stroke P/S is linearly changed, as shown in FIG. 5, by the input voltage CIV to the electromagnetic coil 10.

Figure 6:
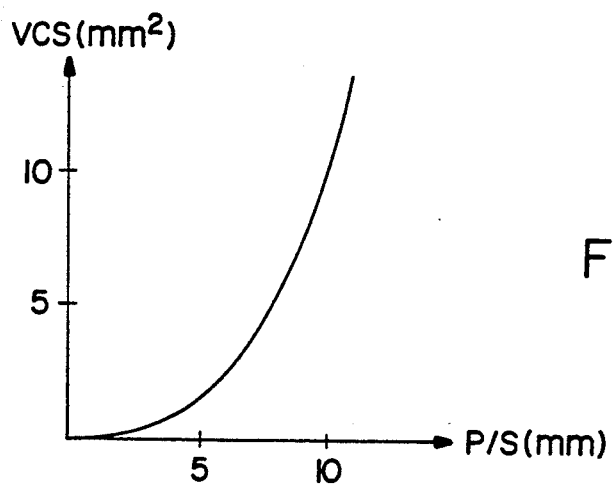
FIG. 6 shows a graph of the characteristic curve of the plunger stroke and sectional area of valve clearance.

In this embodiment, the shape of the control member 18, which is provided at the lower end of the valve body 14, is like a needle, so that the area of the valve clearance VCS can be linearly changed, as shown in FIG. 6, by the plunger stroke P/S. Therefore, the valve clearance 72 can be precisely adjusted by controlling the input voltage to the electromagnetic coil 10 with a transformer, so that the precise flow control can be correctly and easily executed.

The upper end section of the plunger 30 is formed in a tapered shape having the tapered faces 32a and 32b. The upper end section of the plunger 30 may have more than one part which corresponds to the periphery of the plunger 30 on the upper end face thereof. The tapered faces may be not only flat faces which are non-parallel to the axis of the plunger 30 but curved faces. In case of the curved face, the characteristic curve of the input voltage to the plunger stroke will be curved, so the valve clearance 72 can be changed quickly.

Second Embodiment

Figure 7:
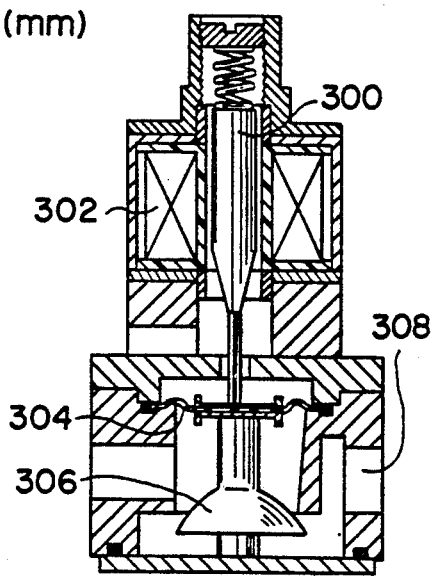
FIG. 7 shows a front sectional view of the proportional control valve as the second embodiment of the solenoid device of the present invention.
Figure 8:
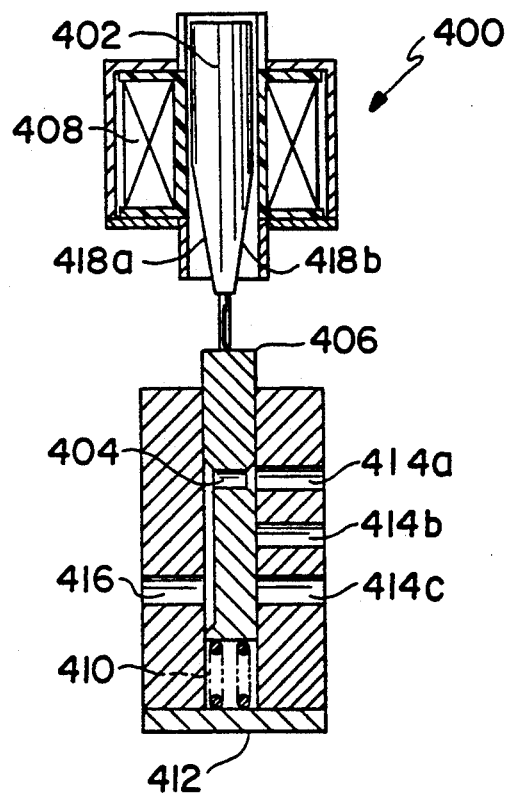
FIG. 8 shows a front sectional view of the selective switching valve as the third embodiment of the solenoid device of the present invention.

The second embodiment will now be explained with reference to FIG. 7. A proportional control valve as a solenoid device is explained in this embodiment.

Shape of the lower end section of a plunger 300 is formed the same as the shape of the upper end section of the plunger of the First Embodiment. Upon passing the electric current through the electromagnetic coil 302, the magnetic force whose direction is downward and which corresponds to the current intensity (or input voltage) works to the plunger 300, so that the pressing force of the plunger 300 works to a valve body 306, which is connected to a diaphragm 304 and whose outer face is formed as a tapered face. With this structure, the amount (or pressure) of the flow, which flows out from an exit 308, can be controlled under the governor theory. In this embodiment, the stroke of the plunger 300 can be linearly changed to the input voltage to the electromagnetic coil 302 due to the shape of the lower and section of the plunger 300. This proportional control valve can be controlled easier than the one described in the item of "BACKGROUND TECHNOLOGY".

Third Embodiment

The third embodiment will now be explained with reference to FIG. 3. A selective switching valve as a solenoid device is explained in this embodiment.

The shape of the lower end section of a plunger 402 of a switching valve 400 is also the same as the shape of the upper end section of the plunger of the First Embodiment. The lower end of the plunger 402 is connected to a valve body 406 having a connecting path 404. The valve body 406 is travelled downward with the stroke corresponding to input voltage to an electromagnetic coil 408 against the elasticity of a coil spring 410, so that the connecting path 404 of the valve body 406 can be connected to one of paths 414a, 414b and 414c of a valve proper 412. Therefore, one of the paths 414a, 414b and 414c can be selected to connect to the flow path 416 of the valve proper 412. At that time, if the length of tapered faces 418a and 418b of the plunger 402 is extended, the plunger stroke can be longer because the surface area of one end section of the plunger having the tapered faces 418a and 418b in the leakage magnetic field is larger than the other end thereof, so that the magnetic force working to the one end is greater than the other. In the leakage magnetic field, if the input voltage to the electromagnetic coil 108 is fixed, the position in which magnetic forces working to both ends of the plunger are balanced is partial in comparison with the case of using a column-shaped plunger. Therefore, the stroke of the plunger 402 can be longer even if the input voltage to the electromagnetic coil 408 is fixed, and the number of the paths can be increased at the user's option.

Fourth Embodiment

Figure 9:
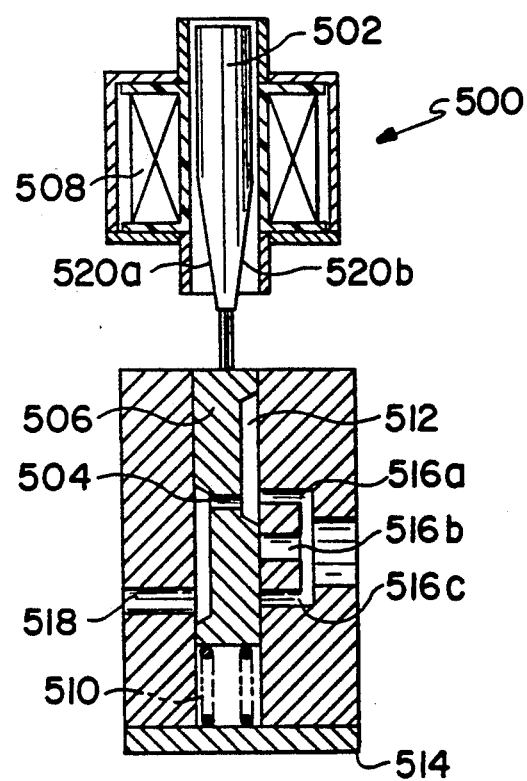
FIG. 9 shows a front sectional view of the selective switching valve as the fourth embodiment of the solenoid device of the present invention.

The fourth embodiment will now be explained with reference to FIG. 9. In this embodiment too, a selective switching valve as a solenoid device is explained. The shape of the lower end section of a plunger 502 of a switching valve 500 is also the same as the shape of the upper end section of the plunger of the First Embodiment.

The lower end of the plunger 502 is connected to a valve body 506 having a connecting path 504. The valve body 506 travels downward with the stroke corresponding to input voltage to an electromagnetic coil 503 against the elasticity of a coil spring 510, so that the number of paths, through which the fluid can flow, can be changed and the amount of the flow also can be changed.

The entrance 512 of the connecting path 504 of the valve body 506 is formed wide, so the connecting path 504, which is connected to a flow path 518 of a valve proper 514, can be selectively connected to a path 516a, paths 516a and 516b, or paths 516a, 516b and 516c. At that time, if the length of the tapered faces 520a and 520b are extended, the plunger stroke, the same as the First Embodiment, can be longer and the number of paths, which can be connected, can be increased.

Fifth Embodiment

Figure 10:
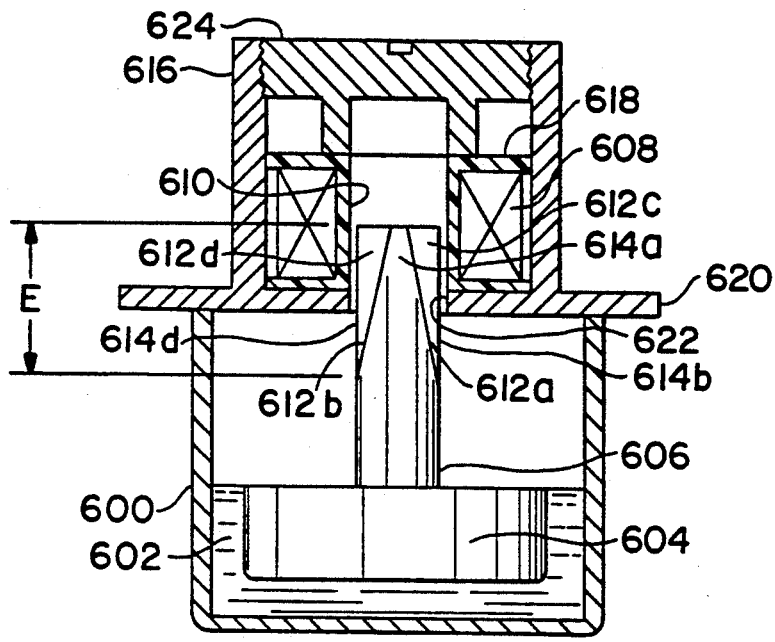
FIG. 10 shows a front sectional view of the displacement sensor as the fifth embodiment of the solenoid device of the present invention.
Figure 11:
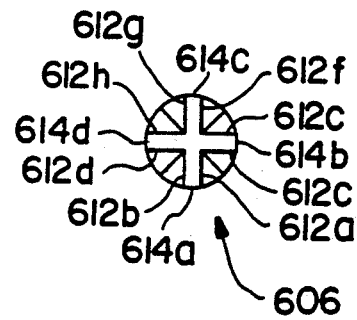
FIG. 11 shows a plan view of the plunger of the fifth embodiment.

The fifth embodiment will now be explained with reference to FIGS. 10-12. A displacement sensor for measuring the level of a liquid surface as a solenoid device is explained in this embodiment.

First, the structure is described.

Liquid 602 whose position of liquid surface will be measured is in a container 600.

A float 604 as a displacing body is made of hard plastic and it can float in the liquid 602.

A plunger 606 is made of magnetizable material and its lower end is fixed on the upper face of the float 604. The shape of the upper end face of the plunger 606 is, as shown in FIG. 11, formed like a cross. There are four (one or more may be acceptable) places, which correspond to the periphery of the plunger 606 and which are close to an inner face of a center hole 610 of a coil 608, at the upper end section of the plunger. Plungers described in the above stated embodiments are also able to be used as a plunger of this embodiment. Note that, in the displacement sensor, the movement of the plunger 606 does not require highly balanced movement like valve devices, so that even a plunger having only one tapered place may be adoptable. The clearance between the outer face of the plunger 606 and the inner face of the center hole 610 of the coil 608 may be varied including slidable contact and enough distance due to uses. There are tapered faces 612a, 612b, 612c, 612d, 612e, 612f, 612g and 612h which are non-parallel to the axis of the plunger 606 and which respectively have the length E and suitable inclination, and there are also four tapered ridges 614a, 614b, 614c and 614d therein. Note that, the tapered faces 612a, 612b, 612c, 612d, 612e, 612f, 612g and 612h are not only flat faces but curved or stepped faces, and the inclination angle thereof may be at user's option. And there may be bored a hole or a depression in the center of the upper end face of the plunger 606.

The coil 608 is fixed in a frame 616. The coil 608 is formed by winding wire around a bobbin 618 but the bobbin 618 may be omitted in some cases.

There is bored a through-hole 622 whose diameter is the same as the center hole 610 of the coil 608 (in which the plunger 606 can be inserted) in the flange 620 of the frame 616 to connect to the inner space of the container 600. Note that, even in the case of no liquid in the container 600, the upper end of the plunger 606 is positioned within the center hole 610 of the coil 608.

A pushing member 624 is screwed in the upper section of the frame 616 to press and to fix the coil 608 on the inner bottom face of the frame 616.

Note that, an oscillator (not shown) is connected to the coil 608.

Next, the action of the displacement sensor will now be described.

When liquid 602 comes into the container 600, the float 604 ascends with the change of the liquid surface and, consequently the plunger 606 also ascends. The coil 608 is previously attracted, so that magnetic flux increases and the reactance of the coil 608 changes with the approach of the plunger 606 to the coil 608. As there are four tapered ridges 614a, 614b, 614c and 614d in the upper end section of the plunger 606, the cross sectional area corresponding to the bottom face of the coil 608 gradually increased (the area changes with the ascending of the plunger 606).

With the change of the reactance of the coil 608, the frequency of the oscillator (not shown) connected to the coil 608 changes in proportion to the change of the reactance, so that the distance of the ascending (or the amount of displacement) of the plunger 606 can be measured as the change of the frequency of the oscillator. The measured value is arithmetically operated by a microprocessor to display.

Figure 12:
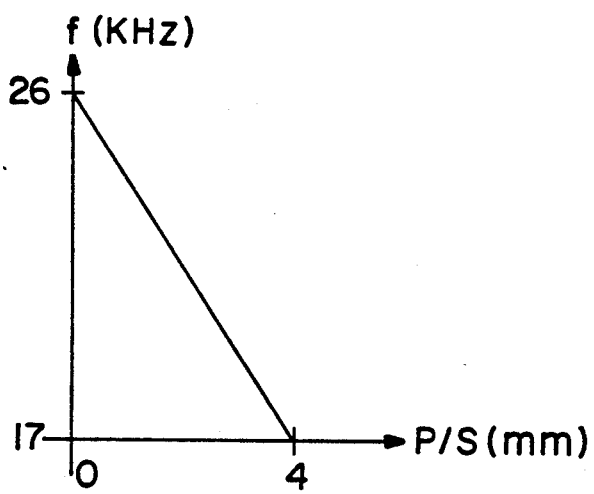
FIG. 12 shows a graph of the characteristic curve of the plunger stroke and the frequency in the fifth embodiment.

The characteristic curve of the frequency of the coil 608 and the stroke P/S of the plunger 606 in this embodiment is shown in FIG. 12.

FIG. 12 shows that the characteristic curve is almost linear because the tapered faces are non-parallel to the axis of the plunger 606, and, for example, the change of the frequency of the coil 608 is 9 KHz when the stroke of the plunger 606 is 4 mm. While, in a conventional displacement sensor under the same conditions, the change of the frequency was 3 KHz when the stroke of the plunger was 4 mm. This result says that the resolution of the displacement sensor of the present embodiment is three times as precise as in the conventional displacement sensor.

Note that, the plunger 606 has four ridges 614a, 614b, 614c and 614d but the following plungers also can be used. They are: a plunger which is diagonally cut to its axial direction; a plunger whose front end is like a cone; a plunger having two ridges or three ridges or . . . ; and a plunger whose sectional shape of lower section is not a circle (e.g. a square pillar).

Moreover, the displacement body is not limited to the float. For example, if a diaphragm is used as the displacement body, the change of the pressure can be measured. And if a plunger is fixed, a coil may be moved with the displacement body.

Sixth Embodiment

Figure 13:
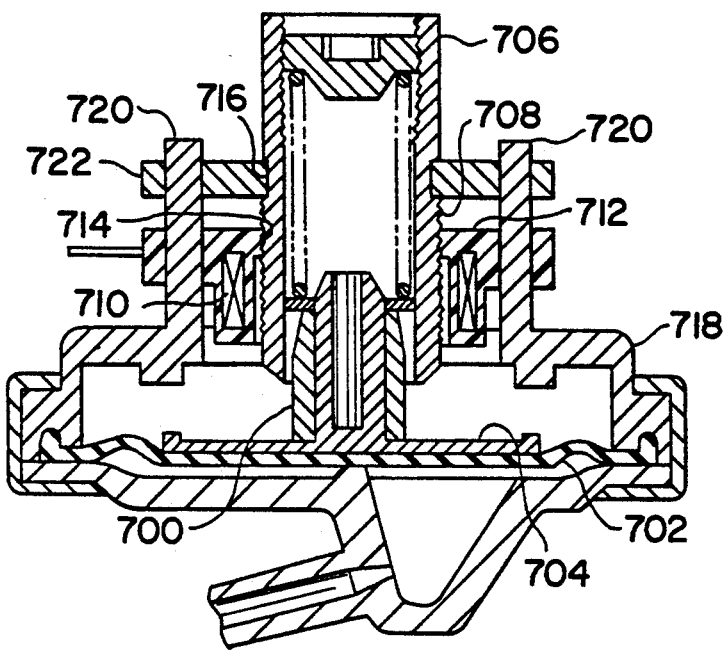
FIG. 13 shows a front sectional view of the displacement sensor as the solenoid device of the sixth embodiment of the present invention.

The sixth embodiment will now be explained with reference to FIG. 13. A displacement sensor as a solenoid device is explained in this embodiment.

The shape of the plunger 700 is the same as the plunger of the Fifth Embodiment. The lower end of the plunger 700 is fixed at a pressure receiving body 704 which is made of non-magnetizable material and which is fixed at a diaphragm 702 as a displacement body.

A cylinder 706 is made of non-magnetizable material, there is threaded a male screw 708 on the outer face thereof, and the plunger 700 is guided in its up-and-down movement by the inner face of the cylinder.

There is threaded a female screw 714 on an inner face of a bobbin 712 of a coil 710, and the coil 710 is screwed over the male screw 708 of the cylinder 706.

The cylinder 706 is rotatable on its axis, but is not able to move to and away from a sensor proper 718 because a supporting plate 722 is engaged with the groove 716 on the outer face of the cylinder 706 and is fixed at guides 720, which are vertically provided on the sensor proper 718.

The coil 710 is guided in the axial direction thereof and is prevented from rotating by guides 720, when the cylinder 706 is rotated.

With this structure, mutual relative position between the coil 710 and the plunger 700 can be adjusted, so that scattering of the initial value of the reactance or the frequency of the coil 710 can be adjusted.

Seventh Embodiment

Figure 14:
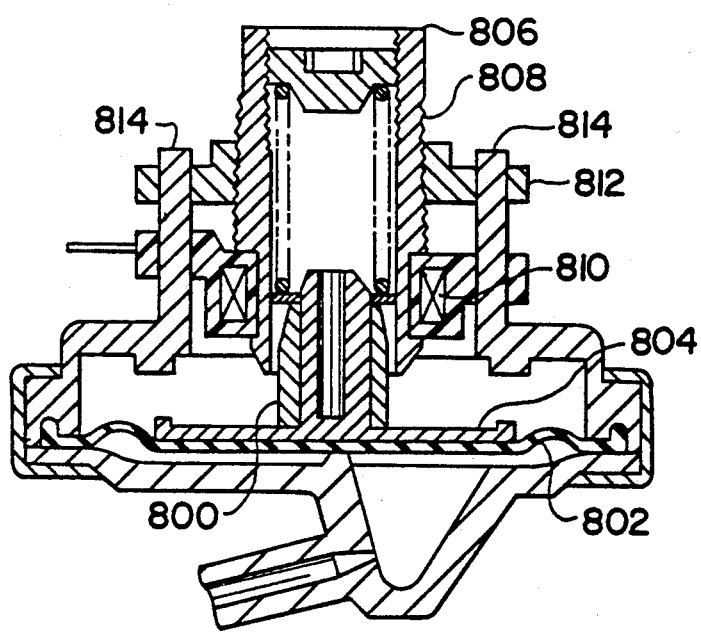
FIG. 14 shows a front sectional view of the displacement sensor as the seventh embodiment of the solenoid device of the present invention.
Figure 15:
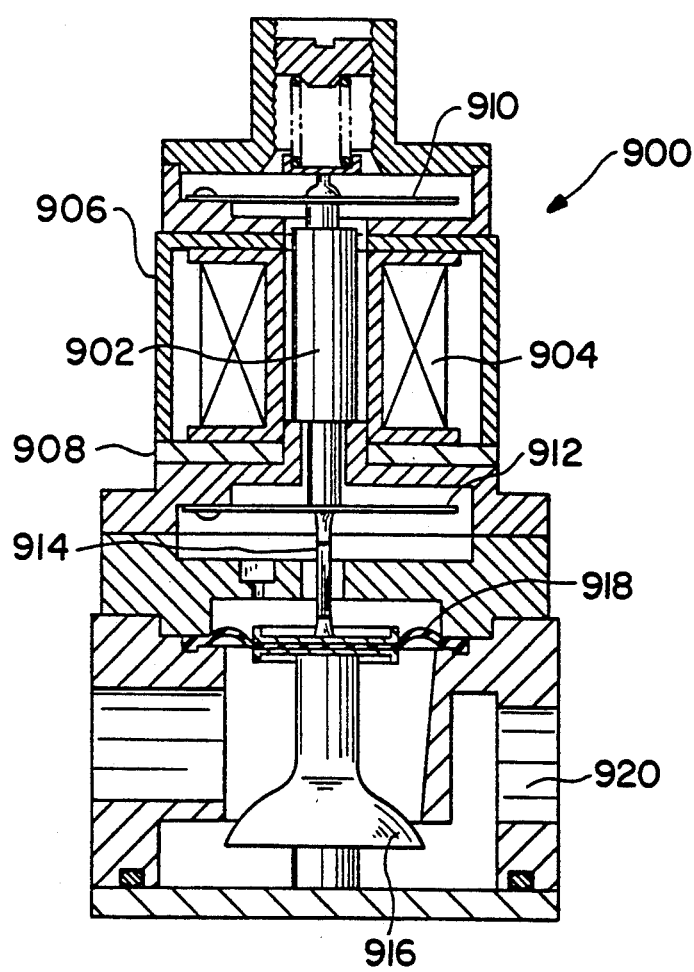
FIG. 15 shows a front sectional view of the proportional control valve as a conventional solenoid device.

The seventh embodiment will now be explained with reference to FIG. 14. In this embodiment too, a displacement sensor as a solenoid device is explained, and this embodiment is, as same as the Sixth Embodiment, to be able to adjust mutual relative position between a coil and a plunger.

The shape of the plunger 800 is the same as the plunger of the Fifth Embodiment. The structure of the plunger, a diaphragm 802 as a displacement body, and a pressure receiving body 804 are the same as the Sixth Embodiment.

A cylinder 806 is made of non-magnetizable material, and a male screw 800 is threaded on the outer face thereof. The plunger 800 is guided in its up-and-down movement by the inner face of the cylinder 806. A coil 810 covers the cylinder 806. The coil is rotatable on the cylinder 806 but is unable to move in the axial direction thereof.

A supporting plate 812 is screwed over the male screw 808 of the cylinder 806 and is fixed at the prescribed position of guides 814. When the cylinder 806, which is screwed to the supporting plate 812, is rotated, the cylinder 806 vertically moves and the coil 810 also vertically moves along the guides 814. With this structure, mutual relative position between the plunger 800 and the coil 810 is adjustable, so that the scattering of the initial value of the reactance or the frequency of the coil 810 can be adjusted.

Preferred embodiments of the present invention have been described above but the present invention is not limited to the above stated embodiments, modification, of course, will be allowed without deviating the scope of the invention.

We claim

1. A displacement sensor comprising a sensor body, an electromagnetic coil, said coil having an inward facing surface surrounding the central cavity thereof and an axial direction, an electric current supply means for supplying electric current to said coil, a plunger, said plunger being made of magnetizable material, being disposed within the central cavity of said coil, and being capable of moving in said axial direction of said coil, a displacement body, said displacement body being movable with movement of said displacement body causing proportional movement of said plunger along said axial direction, said coil reflecting the amount of displacement of said displacement body via the movement of said plunger by change of reactance, and a detection means for detecting the change of reactance of said coil as said plunger changes position along said axial direction, and wherein said plunger includes a middle section, said middle section having a predetermined width, an upper end section having an upper end face, a parallel peripheral surface, said parallel peripheral surface extending parallel to the longitudinal axis of said plunger from said middle section to intersect with said upper end face to form more than one portion of a peripheral edge of said upper end face.

2. The displacement sensor according to claim 1 further comprising a coil bobbin, said bobbin being cylindrically shaped and being disposed within the central cavity of said coil, said coil being disposed about said bobbin, said bobbin having an interior facing surface, and a cylindrical body, said body having an inner facing surface for guiding the movement of said plunger and an outer facing surface, said outer facing surface having a first circumferential portion, said first circumferential portion having a first screw thread section formed thereon, and a second circumferential portion, said second circumferential portion being disposed within said central cavity and affixed to said interior facing surface, said body being made from a non-magnetizable material;

wherein said sensor body includes a sensor unit, a sensor support plate, said plate having a central aperture therethrough and an inward facing surface surrounding said aperture, said inward facing surface having an inward facing screw thread section formed thereon, said inward facing screw thread section being engageable with said first screw thread section to dispose said plate at a predetermined position with respect to said sensor unit, and sensor guides, said sensor guides extending from said sensor unit to position said plate at said predetermined position and to guide said body as said body is rotated.

3. The displacement sensor according to claim 1 further comprising a coil bobbin, said bobbin being cylindrically shaped and being disposed within the central cavity of said coil, said coil being disposed about said bobbin, said bobbin having an interior facing surface, said interior facing surface having an interior facing screw thread section, and a cylindrical body, said body having an inner facing surface for guiding the movement of said plunger and an outer facing surface, said outer facing surface having a first circumferential portion, said first circumferential portion having a first screw thread section formed thereon, said first screw thread section being engageable with said interior facing screw thread section, and a second circumferential portion, said second circumferential portion having an annular groove, said body being made from a non-magnetizable material;

wherein said sensor body includes a sensor unit, a sensor support plate, said plate having a central aperture therethrough and an inward facing surface surrounding said aperture, said inward facing surface being engageable with said annular groove to fixedly dispose said plate at a predetermined position with respect to said sensor unit, and sensor guides, said sensor guides extending from said sensor unit to position said plate at said predetermined position and to preclude rotation of said bobbin, and wherein said body is rotatable to move said bobbin in said axial direction.

4. The displacement sensor according to claim 2 wherein said plunger further includes at least one non-parallel peripheral surface, said non-parallel peripheral surface being non-parallel to the longitudinal axis of said plunger and extending from said peripheral edge of said upper end face toward said middle section.

5. A displacement sensor according to claim 3 wherein said plunger further includes at least one non-parallel peripheral surface, said non-parallel peripheral surface being non-parallel to the longitudinal axis of said plunger and extending from said peripheral edge of said upper end face toward said middle section.

* * * * *